G. MITCHELL.
APPARATUS FOR THE TREATMENT OF ORES.
APPLICATION FILED SEPT. 7, 1910.
997,405.
Patented July 11, 1911.
7 SHEETS—SHEET 1.
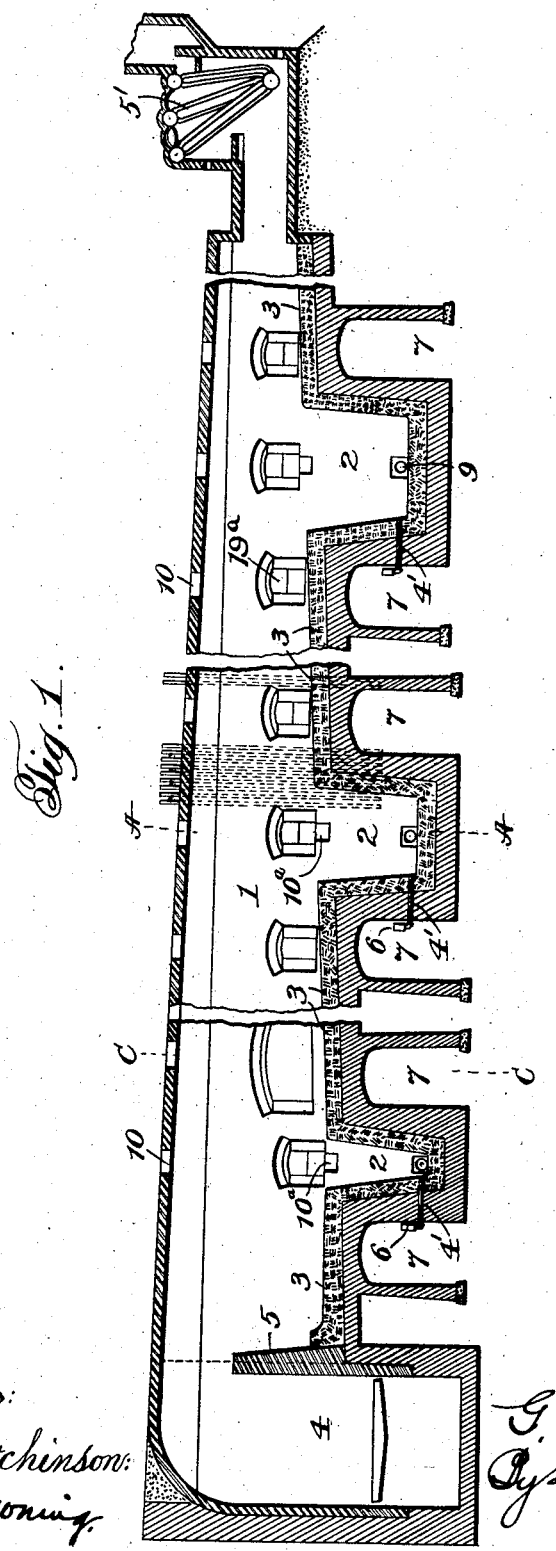

G. MITCHELL.
APPARATUS FOR THE TREATMENT OF ORES.
APPLICATION FILED SEPT. 7, 1910.
997,405.
Patented July 11, 1911.
7 SHEETS—SHEET 2.
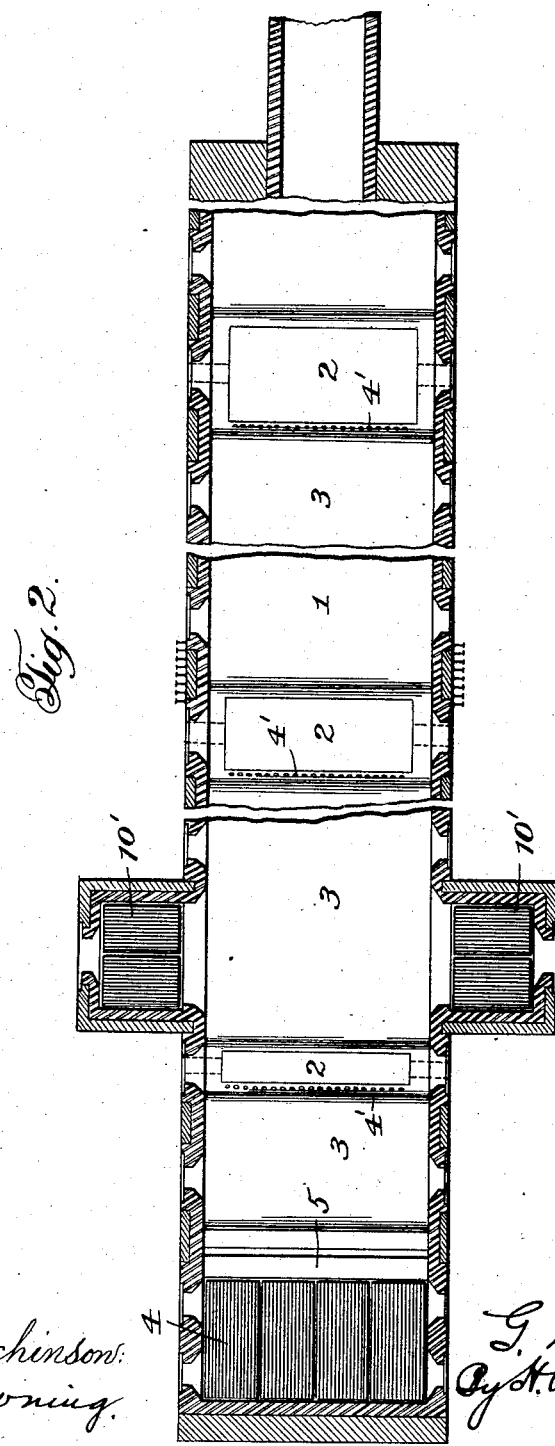

G. MITCHELL.
APPARATUS FOR THE TREATMENT OF ORES.
APPLICATION FILED SEPT. 7, 1910.
997,405. Patented July 11, 1911.
7 SHEETS—SHEET 3.
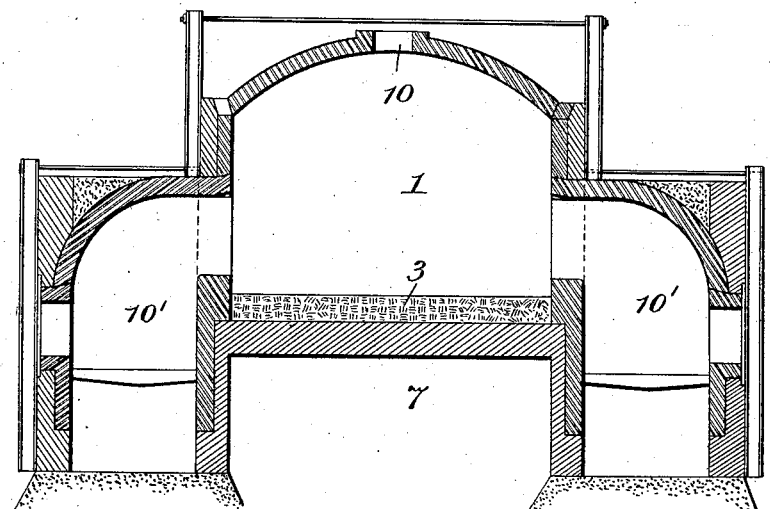
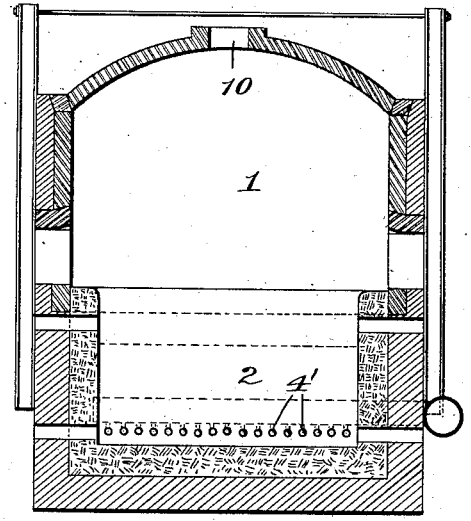

G. MITCHELL.
APPARATUS FOR THE TREATMENT OF ORES.
APPLICATION FILED SEPT. 7, 1910.
997,405.
Patented July 11, 1911.
7 SHEETS—SHEET 4.
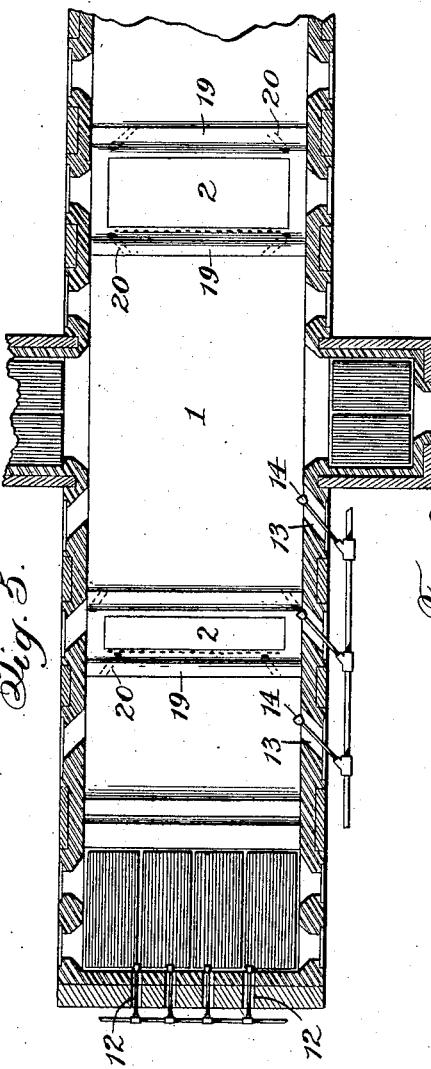
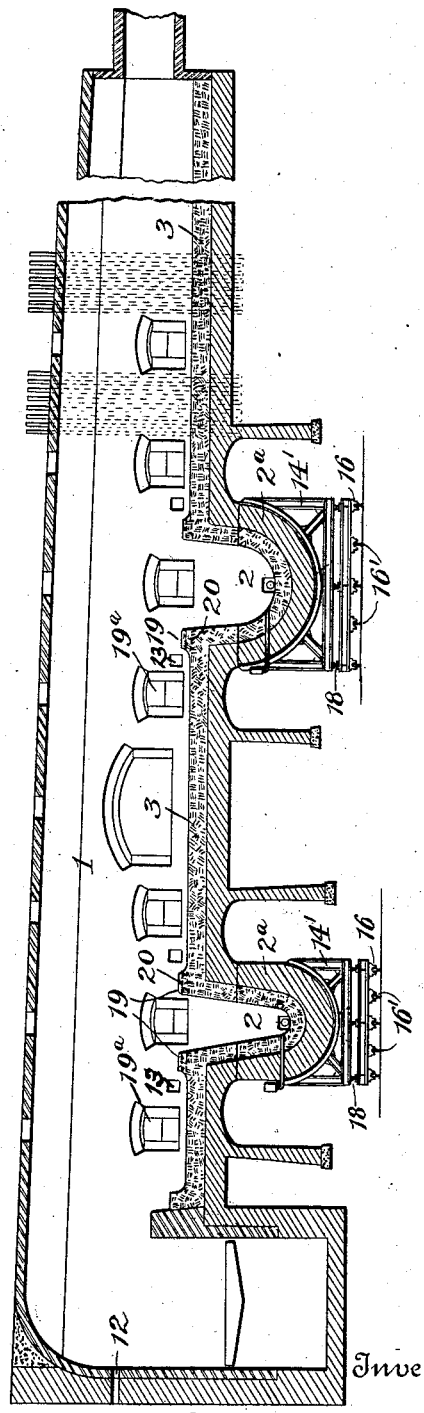

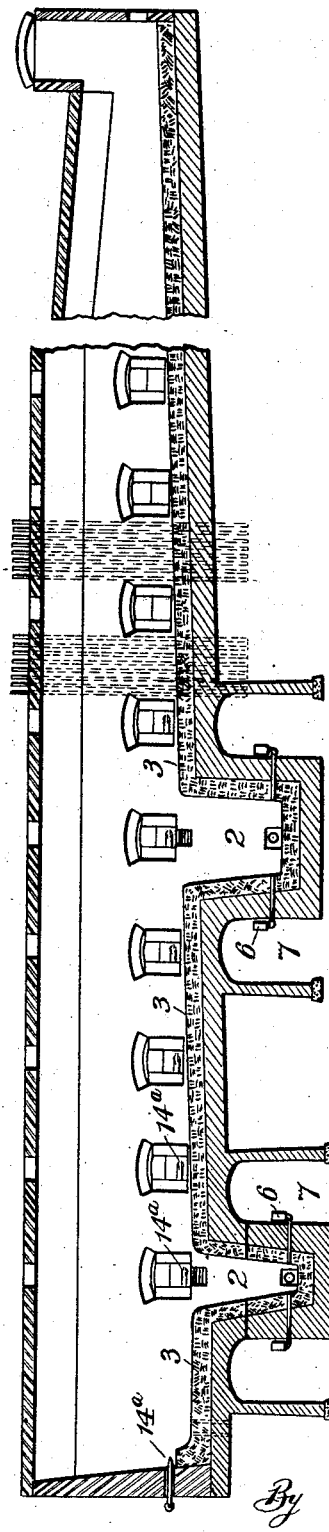

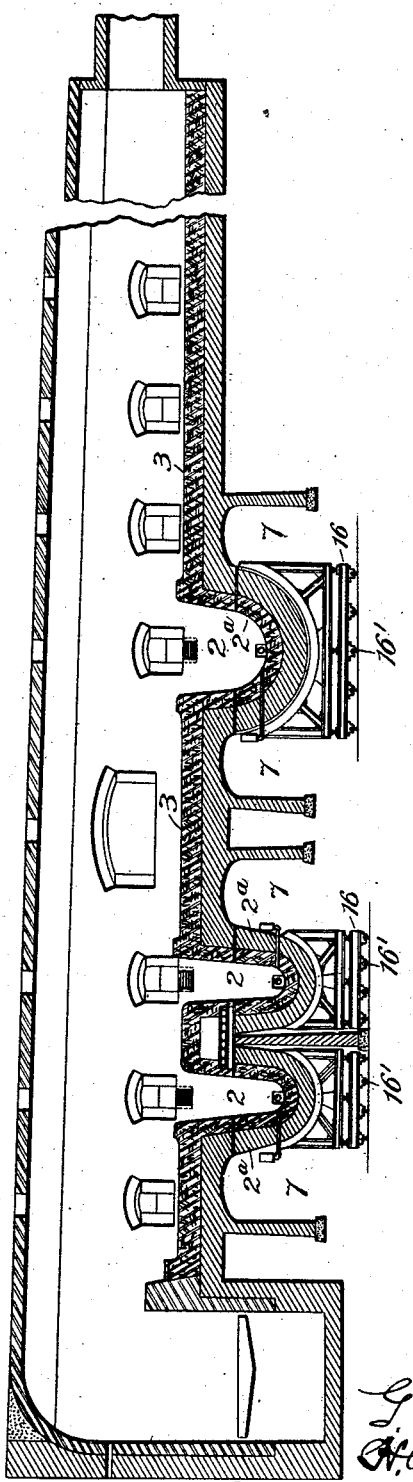

G. MITCHELL.
APPARATUS FOR THE TREATMENT OF ORES.
APPLICATION FILED SEPT. 7, 1910.
997,405.
Patented July 11, 1911.
7 SHEETS—SHEET 7.
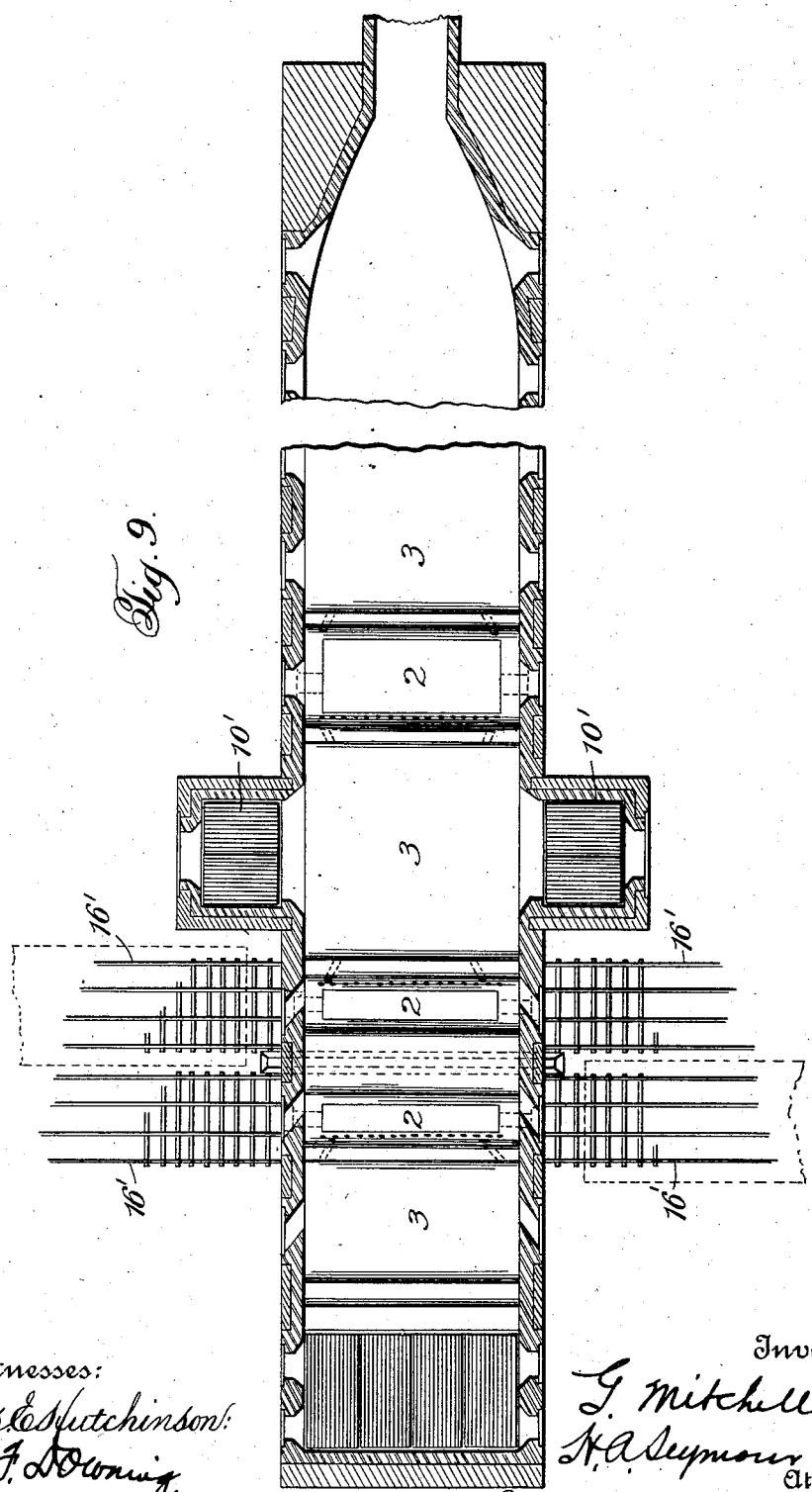

UNITED STATES PATENT OFFICE.

GEORGE MITCHELL, OF LOS ANGELES, CALIFORNIA.

APPARATUS FOR THE TREATMENT OF ORES.

997,405. Specification of Letters Patent. Patented July 11, 1911.

Application filed September 7, 1910. Serial No. 580,796.

*To all whom it may concern:*

Be it known that I, GEORGE MITCHELL, of Los Angeles, in the county of Los Angeles and State of California, have invented certain new and useful Improvements in Apparatus for the Treatment of Ores; and I do hereby declare the following to be a full, clear, and exact description of the invention, such as will enable others skilled in the art to which it appertains to make and use the same.

My invention relates to an improvement in process and apparatus for the treatment of ores, and particularly copper, iron, lead, zinc, cobalt, nickel, gold and silver ores.

The object of the invention is to provide means whereby the ore, say for instance copper, may be smelted, and the matte reduced or bessemerized or converted in one heat, and by a single continuous operation.

My invention consists broadly in combining with a furnace a series of hearths and a series of converter chambers located intermediate the hearths, whereby the matte and slag, formed by the smelting, gravitates or flows into the converter chambers, and thus utilize the heat generated through the application of high pressure air blast through the molten mass of matte, for smelting the ores on the hearths, thereby reducing the use of carbonaceous fuels to a minimum.

My invention further consists in parts and combinations of parts and in the details of construction as will be more fully described and pointed out in the claims.

In the accompanying drawings, Figure 1 is a view in vertical longitudinal section of a furnace showing one embodiment of my invention. Fig. 2 is a view in horizontal longitudinal section. Fig. 3 is a view in transverse vertical section on the line C C, of Fig. 1; Fig. 4 is a similar section on the line A A of Fig. 1. Fig. 5 is a view in horizontal section of the furnace shown in Fig. 6. Fig. 6 is a view similar to Fig. 1 showing converters with removable bottoms mounted on trucks, and also showing oil burners over the grates. Fig. 7 is a view in vertical longitudinal section of a portion of a furnace adapted to burn oil only. Fig. 8 is a view in longitudinal vertical section of a portion of a furnace embodying another modification, and Fig. 9 is a view in horizontal section of same.

1 represents a furnace having a cross sectional area substantially as shown in Fig. 4, and of a length sufficient to provide ample smelting hearths 3, and for the converters 2, which as shown are located intermediate the hearths. This furnace is provided at one end with a fire box 4, which opens directly above the bridge wall 5 into the furnace, and preferably at its other end adjacent the stack with a steam generator or boiler 5', which utilizes portions of the waste heat for generating the steam employed for actuating the blower for the converters.

In the construction disclosed in Fig. 1, I have shown three converters 2 formed as an integral part of the furnace structure, with the two hearths 3 on opposite sides of the converter nearest the fire box pitched so as to discharge the matte into said converter, and each of the other converters with a hearth 3 to the rear, and pitched toward the front so as to discharge the matte into the converter in advance of the hearth.

I would have it understood that I do not confine myself to any particular number of converters. I may use one, but I prefer a plurality, and I may provide a single smelting hearth for each, or may slope the hearths that each converter will be supplied with matte from both sides.

Each converting chamber 2 is provided with twyers 4' and twyer box 6, for the transmission of the blast from a blowing engine, and tunnels 7, are provided at each side of each converter for the convenience of the operators in examining the converting chambers and twyers, and to provide space for the manipulation of tools through the twyers for removing accretions that form inside of the twyer openings.

The converters as shown, are sunken below the hearths, thereby providing a space the full depth of the furnace above the converters, which greatly minimize the wear and tear on the roof, caused by mechanical action and the chemical reaction of the matte during the converter operation.

In the construction shown in Fig. 1 the several converters are of the same depth and located with the top of one nearer the stack in a higher plane than the one next thereto and so on throughout the series, so that the converters may be tapped and the product flow by gravity through a suitable trough into the converter next in advance. With a series of these converters such as I have shown, the treatment in the second converter would produce what is known as "white metal", while the treatment in the third converter would convert the white metal into metallic copper.

With the construction as shown, or with the converters all in the same horizontal plane, the matte may after treatment in the converter nearest the stack, be drawn off through a tap hole 9 near the bottom of the converter, into a ladle, and conveyed by means of a crane to the converter next in advance, and discharged into the latter through a suitable spout at the side, or through the openings 10 in the top of the furnace, and after treatment in the second converter, be conveyed to the third converter and so on throughout the series, if more than three be used. If used as above described, I prefer to place the ore on the hearth supplying the first converter, so that the other converters of the series will contain nothing but the partly refined metal.

Instead however of using the converters in sequence as above explained, all of the converters may be operated on what is known as the first stage of converting copper matte, each taking the matte from its hearth or hearths, and reducing it to the point of elimination of nearly all the iron contents; after which it is drawn off and finished or the reduction completed in another furnace. By this latter operation there would be obtained the greatest possible amount of heat for smelting, as it is from the first stage of the converting operation that the greatest amount of heat is developed.

In addition to the fire box 4 at the end of the furnace I have provided the fire boxes 10' at the side as shown in Fig. 2, which may be advantageously used at the commencement of the smelting operation. After the smelting has progressed up to the point where there is a sufficient charge in one or more of the converters, to blow, the heat generated in the converters alone will in many instances be ample for smelting purposes. If desired the furnace may be started from matte obtained from an auxiliary furnace and thus dispense altogether with the use of carbonaceous fuel in starting the smelting. Each converter chamber is provided near its top with a slag tap $10^a$, through which the slag may be removed, and each may be constructed with an acid or basic lining or both as may be desired.

In the construction shown in Figs. 5 and 6, I have provided inlets 12 for oil burners in the fire box, and also openings 13 at the side for oil burners 14. I have also shown the converters with curved, instead of flat bottoms, and provided them with removable bottoms $2^a$ mounted in cradles 14', carried on trucks 16, the wheels of which run on trackways 16', the cradles being supported on hydraulic jacks 18, by which the removable section of the converter may be raised into position and lowered for its removal to a point where it can be conveniently relined. With this latter construction when a removable bottom $2^a$ has been removed for repair or relining, another can be run into place, thus saving the time required to repair or reline the removed section. In this form of furnace I have also shown bridge walls 19 provided with tap holes 20 arranged conveniently with relation to the sides, so that clay plugs may be placed in the taps or removed therefrom as desired. The bridge walls form dams for the storage of the matte, during the blowing operation, hence making the feeding of the matte to the converters intermittent instead of continuous, as in the other form. By removing the clay plugs, the matte will be free to run into the converters as it is desired. With the construction comprising bridge walls, I provide doors through which skimming tools may be operated for removing the slag made by the smelting of the ores. These skimming doors may be arranged in the side walls of the furnace, or may be carried by any of the doors in the sides of the furnace opposite the hearths.

In the construction shown in Fig. 7, I have dispensed altogether with the fire boxes and show oil burners $14^a$ at the end and sides. In this construction I show two converters with twyers and twyer boxes on both sides.

In the construction shown in Figs. 8 and 9 I have arranged two converters side by side without an intervening hearth, the two converters, and the larger one also shown, being mounted on trucks as previously explained, so as to be moved sidewise for renewal or repair. With these furnaces the ores can be charged onto the hearths through openings in the roof of the furnace, and as explained, are smelted by the heat generated from burning carbonaceous fuel. After sufficient of the matte has been liberated and deposited in a converter or converters, the air blasts are started and the heat generated thereby then smelts or assists in smelting the remaining ores. It will therefore be seen that by my improvement I smelt the ores and refine the matte by a continuous operation, thus doing with one apparatus the work generally performed by separate processes thereby saving in numerous respects the cost of producing refined metal. The converter chamber may, if necessary, be initially heated by fuel oil introduced through burners or through the twyers or by coal introduced through suitable openings in the furnace into the converter chambers.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. In a combined smelting and converting furnace, the combination of a furnace chamber, a series of hearths therein, and a converter for each hearth, the converters located in position to receive the matte by gravity from their respective hearths.

2. In a combined smelting and converting furnace, the combination of a horizontal furnace chamber having a series of hearths, and a converter intermediate two hearths and adapted to receive the matte by gravity from both hearths.

3. In a combined smelting and converting furnace, the combination of an elongated furnace chamber, having a series of converters and a hearth for each converter the said hearths each sloping toward its respective converter so as to discharge matte therein by gravity.

4. In a combined smelting and converting furnace, the combination of an elongated furnace chamber, the floor of which is divided up into a series of hearths, and converters intermediate the hearths, the converters being so located with relation to the hearths as to receive the matte by gravity therefrom.

5. In a combined smelting and converting furnace, the combination of an elongated furnace chamber the floor of which is divided into a series of hearths, and converters, the lower section of each converter being independent of the upper section and mounted on a truck whereby it may be removed, the series of converters being so located with relation to the hearths as to receive the matte by gravity therefrom.

6. In a combined smelting and converting furnace, the combination of an elongated furnace chamber the floor of which forms a hearth and the upper section of a converter, the lower section of the converter being removable.

7. In a combined smelting and converting furnace, the combination of a furnace chamber, a series of hearths therein and a series of converters so located with relation to the hearths as to receive the matte by gravity therefrom, the lower section of each converter being removable.

8. In a combined smelting and converting furnace, a furnace chamber the floor of which forms a series of hearths and the upper portion of a series of converters, the lower portions of the converters being mounted on trucks.

9. In a combined smelting and converting furnace, the combination of an elongated furnace chamber having a series of hearths and converters alternately arranged lengthwise the furnace, the converters being so located with relation to the hearths as to receive the matte by gravity therefrom, a fuel burner at one end of the chamber and a stack at the other end.

10. In a combined smelting and converting furnace, the combination of a furnace chamber, the floor of which forms a hearth and the upper section of a converter, the lower section of the converter being independent of the upper section and mounted on a truck, a fuel burner adjacent one end of said furnace chamber and a stack at the opposite end.

11. In a combined smelting and converting furnace, the combination of a horizontal furnace chamber having a series of hearths and a converter for each hearth, each hearth sloping toward its converter so as to discharge the matte therein by gravity and a bridge wall separating each hearth from its converter.

12. In a combined smelting and converting furnace, the combination of an elongated furnace chamber, coal and oil burners at one end thereof and a stack at the other end, the said furnace having a series of converters and a hearth for each converter, the said hearths each sloping toward its respective converter so as to discharge the matte therein by gravity.

13. In a combined smelting and converting furnace, the combination of a furnace chamber the floor of the latter having a series of converters, a hearth for each converter, the said hearths each sloping toward its respective converter so as to discharge the matte therein by gravity, a bridge wall separating each hearth from its converter and tap openings through said bridge walls.

In testimony whereof, I have signed this specification in the presence of two subscribing witnesses.

GEORGE MITCHELL.

Witnesses:
OTTO WILLIAM STRODEHOFF,
JANE MERLE ROOD.